United States Patent
Tamai et al.

(10) Patent No.: US 6,812,672 B2
(45) Date of Patent: Nov. 2, 2004

(54) ELECTRIC CHARGE CONTROL DEVICE AND LOAD DRIVING DEVICE USING THE SAME

(75) Inventors: Yasuhiro Tamai, Shizuoka (JP); Tetsuya Hasegawa, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/212,040

(22) Filed: Aug. 6, 2002

(65) Prior Publication Data

US 2003/0030415 A1 Feb. 13, 2003

(30) Foreign Application Priority Data

Aug. 7, 2001 (JP) ........................................ 2001-239530

(51) Int. Cl.[7] .................................................. H02J 7/00
(52) U.S. Cl. ...................................... 320/128; 320/127
(58) Field of Search ................................ 320/128, 127, 320/145, 114, 134, 135, 137, 140, 143, 139; 363/15, 124

(56) References Cited

U.S. PATENT DOCUMENTS 5,161,097 A * 11/1992 Ikeda .......................... 363/124

6,133,712 A * 10/2000 Yeon .......................... 320/145

FOREIGN PATENT DOCUMENTS

| DE | 198 46 319 C1 | 2/2000 |
|----|---------------|--------|
| DE | 101 18 177 A1 | 10/2001 |
| JP | 60-245463 | 12/1985 |
| JP | 10-84626 | 3/1998 |
| JP | 11-3126 | 1/1999 |

* cited by examiner

*Primary Examiner*—Lawrence Luk
(74) *Attorney, Agent, or Firm*—Finnegan, Henderson, Farabow, Garrett, & Dunner, L.L.P.

(57) ABSTRACT

A load driving device of the invention includes an electric charge control unit 3, which charges a low-voltage battery 7 with a direct-current voltage from a DC/DC converter 2 that converts a high voltage from a high-voltage battery 1 into a low voltage. The electric charge control unit 3 includes a switching regulator 11 for performing switching of the direct-current voltage from the DC/DC converter 2 varying an output voltage supplied to the low-voltage battery 7, a series regulator 12 for inputting the direct-current voltage from the DC/DC converter 2 and adjusting power consumption to vary an output voltage supplied to the low-voltage battery 7, and a voltage-current detector 13 for detecting a voltage in accordance with a charge ratio of the low-voltage battery 7.

5 Claims, 2 Drawing Sheets

ELECTRIC CHARGE CONTROL DEVICE AND LOAD DRIVING DEVICE USING THE SAME

BACKGROUND OF THE INVENTION

1. Field of the Invention

The present invention relates to an electric charge control device for charging a secondary battery with electricity installed on a vehicle, and to a load driving device using the electric charge control device.

2. Description of the Related Art

In recent years, developments have progressed in establishing technologies to drive various loads installed in an automobile by using a high-voltage power source (42 volts) connected to a motor-generator, which is advantageous for improving mileage.

However, a high voltage cannot be applied to some low-voltage-operating loads such as an electric control unit (ECU) installed in an automobile. In order to supply electricity to these loads, a DC/DC converter is used for converting the high voltage into a low voltage of 14 volts, which is a conventional voltage standard. As a low-voltage battery to be used upon driving low-voltage loads while using the DC/DC converter, use of an environmentally friendly secondary battery is considered instead of a lead accumulator.

Nevertheless, upon using a secondary battery, the secondary battery used to be charged by a constant voltage in line with temperature characteristics thereof. However, in a case of using a secondary battery made of nickel-hydrogen or the like, it is preferred to charge the battery with a low electric current in order to improve charging efficiency.

SUMMARY OF THE INVENTION

It is an object of the present invention to provide an electric charge control device capable of charging a secondary battery with electricity in a state of high regulator efficiency, and to provide a load driving device using the electric charge control device.

The first aspect of the present invention provides an electric charge control device, comprising: an electric power source for supplying a first voltage; a converter connected to the electric power source for converting the first voltage into a second voltage which is lower than the first voltage; a secondary battery for charging a direct-current voltage from the converter; a switching regulator for inputting the second voltage from the converter and switching to vary an output voltage which is supplied to the secondary battery; a series regulator for inputting the second voltage from the converter and adjusting power consumption to vary an output voltage which is supplied to the secondary battery; a voltage detector for detecting the output voltage from the switching regulator and the series regulator; and a controller for controlling the output voltage based on a voltage value detected by the voltage detector so as to charge from any one of the switching regulator and the series regulator to the secondary battery with a constant electric current.

According to the first aspect, the output voltage value is controlled so that the secondary battery is charged with a constant electric current from the switching regulator or the series regulator based on the voltage values detected by the voltage detector. Therefore, when the output voltage of the switching regulator or the series regulator is varied in accordance with a charged voltage of the secondary battery, it is possible to use one of the regulators having a higher converting efficiency in response to the output voltage. Hence, the secondary battery can be charged with high regulator efficiency.

The second aspect of the present invention provides the electric charge control device according to the first aspect of the present invention, wherein the controller performs controlling so that the secondary battery is charged by the switching regulator when the voltage value is at a predetermined value or below, the controller performs controlling so that the secondary battery is charged by the series regulator when the voltage value is at the predetermined value or more.

According to the second aspect, the switching regulator is used when the voltage values detected by the voltage detector are at the predetermined value or below because the charged voltage of the secondary battery is low, and the series regulator is used when the voltage values is the predetermined value or more because the charged voltage is high. Since one of the regulators with a higher converting efficiency is thus selected for use based on the predetermined value, the secondary battery can be charged with high regulator efficiency.

The third aspect of the present invention provides the electric charge control device according to the second aspect of the present invention, wherein the controller retains the predetermined value indicating an output voltage at which the efficiency of the series regulator exceeds the efficiency of the switching regulator.

According to the third aspect, the controller retains the predetermined value indicating the output voltage at which the efficiency of the series regulator exceeds efficiency of the switching regulator. Therefore, it is possible to use the regulator with the greater efficiency by switching between the switching regulator and the series regulator so as to set an electric current value to enhance the efficiency of the secondary battery.

The fourth aspect of the present invention provides the electric charge control device according to the second aspect of the present invention, wherein the controller performs controlling so that the output voltage from any one of the series regulator and the switching regulator is set to a value slightly higher than a charged voltage of the secondary battery.

The fifth aspect of the present invention provides a load driving device, comprising: an electric power source for supplying a first voltage; a converter connected to the electric power source for converting the first voltage into a second voltage which is lower than the first voltage; an electric charge control unit connected to the converter; a relay provided between the converter and the electric charge control unit; a switching unit connected to the relay; a load unit connected to the converter and the relay; and a secondary battery connected to the electric charge control unit and the relay for charging a direct-current voltage from the converter, the electric charge control unit, comprising: a switching regulator for inputting the second voltage from the converter and switching to vary an output voltage which is supplied to the secondary battery; a series regulator for inputting the second voltage from the converter and adjusting power consumption to vary an output voltage which is supplied to the secondary battery; a voltage detector for detecting the output voltage from the switching regulator and the series regulator; and a controller for controlling the output voltage based on a voltage value detected by the voltage detector so as to charge from any one of the switching regulator and the series regulator to the secondary battery with a constant electric current, wherein an electric charge is supplied from the secondary battery to the load unit when the relay is set to a conductive state owing to a signal from the switching unit, and wherein the electric charge is supplied from the converter to the load unit when the relay is set to an open state.

According to the fifth aspect, the electric charge control unit is provided for controlling the output voltage value so as to charge the second battery with a constant electric current from the switching regulator or the series regulator based on the voltage values detected by the voltage detector. In this way, the second battery can be charged efficiently. Since the electric charges are supplied from the converter and from the secondary battery, it is possible to drive the load unit stably.

The sixth aspect of the present invention provides the load driving device according to the fifth aspect of the present invention, wherein the relay is set to the open state when the converter is in operation, and the relay is set to the conductive state when the converter stops operating.

The seventh aspect of the present invention provides the load driving device according to the fifth aspect of the present invention, wherein the load unit is a load driven by a voltage lower than the first voltage.

BRIEF DESCRIPTION OF THE DRAWINGS

The invention will be described with reference to the accompanying drawings wherein.

DETAILED DESCRIPTION OF THE PREFERRED EMBODIMENT

To describe the present invention more in detail, a preferred embodiment of the present invention will be explained with reference to the drawings below.

Figure 1:
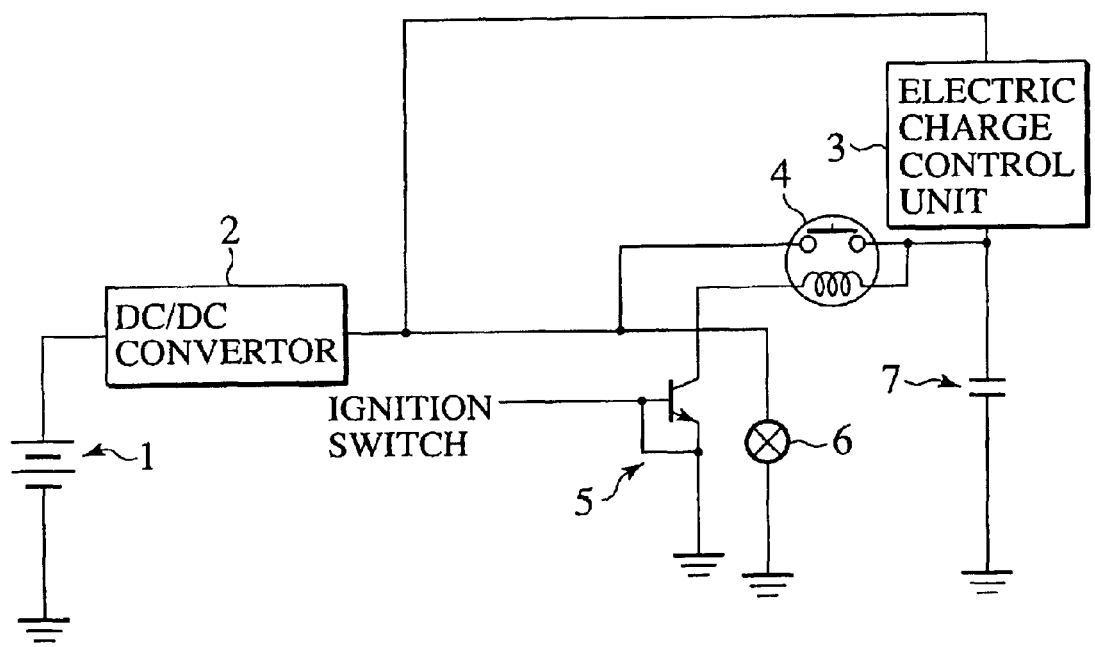
FIG. 1 is a circuit diagram illustrating a constitution of a load driving device according to an embodiment of the present invention.

The present invention is typically applicable to a load driving device having a constitution as illustrated in FIG. 1.

[Constitution of Load Driving Device]

As shown in FIG. 1, this load driving device includes a high-voltage battery 1 for generating a high voltage, a DC/DC converter 2 connected to the high-voltage battery 1, an electric charge control unit 3 connected to the DC/DC converter 2, a relay 4 provided between the DC/DC converter 2 and the electric charge control unit 3, a switching unit 5 connected to the relay 4, a load 6 connected to the DC/DC converter 2, and a low-voltage battery 7 connected to the DC/DC converter 2 via the electric charge control unit 3.

The load driving device is installed in a vehicle, for example, and is used for driving the load 6 provided in the vehicle. The high-voltage battery 1 charges electricity from a motor-generator, for example, whereby the high-voltage battery 1 generates a high voltage of 42 volts and supplies the voltage to the DC/DC converter 2. Moreover, the high-voltage battery 1 may be driven and supply the high voltage directly to an unillustrated load to be driven by the high voltage, which is installed in the vehicle.

The load 6 is a load to be driven by a voltage lower than the voltage outputted from the high-voltage battery 1. For example, a lamp, an electric control unit (ECU) to perform processing for controlling various parts of the vehicle, or the like is cited as the load 6. The load 6 is driven by a voltage of 14 volts, which is lower than the high voltage of 42 volts.

The low-voltage battery 7 is constituted as a battery with a smaller capacity than the high-voltage battery 1. The low-voltage battery 7 is a secondary battery made of nickel-hydrogen or the like. Electric charges are accumulated and charged in the low-voltage battery 7 by a voltage supplied from the electric charge control unit 3. Although it depends on the constitution, it is generally preferred that the low-voltage battery 7 is charged with a low electric current from a viewpoint of charging efficiency.

The DC/DC converter 2 is provided between the high-voltage battery 1 and the load 6. The DC/DC converter 2 converts the high voltage from the high-voltage battery 1 into a low voltage suitable for driving the load 6 and thereby supplies the low voltage to the load 6. Moreover, the DC/DC converter 2 supplies the low voltage to the electric charge control unit 3.

Regarding the electric charge control unit 3, an input side thereof is connected to the DC/DC converter 2 and an output side thereof is connected to the relay 4 and to the low-voltage battery 7. In this way, the DC/DC converter 2 and the low-voltage battery 7 are connected via the electric charge control unit 3.

Figure 2:
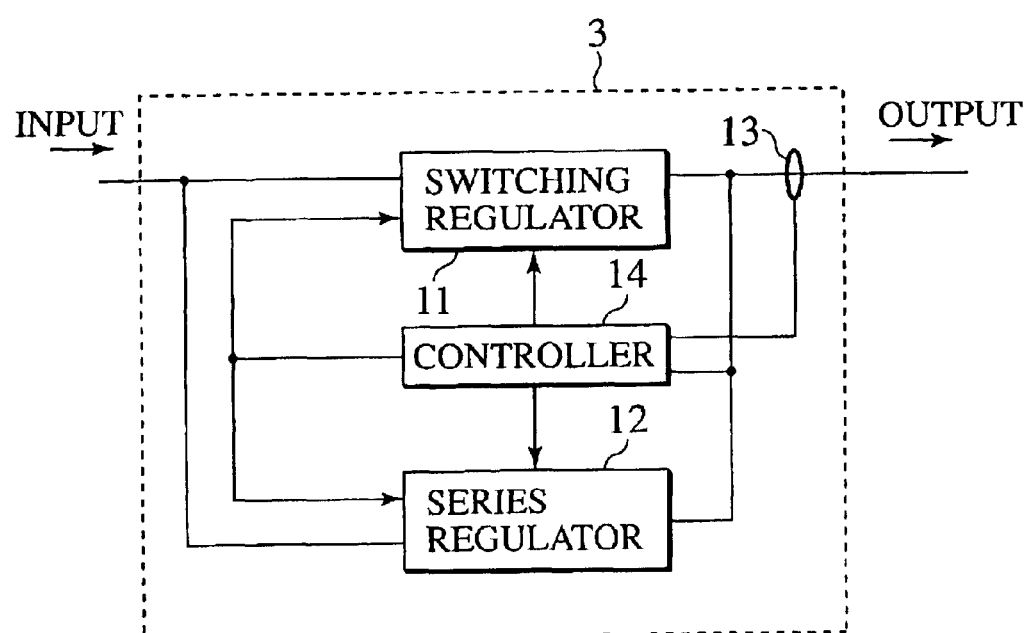
FIG. 2 is a block diagram illustrating a constitution of an electric charge control unit according to an embodiment of the present invention.

As shown in FIG. 2, in the electric charge control unit 3, a switching regulator 11 and a series regulator 12 are connected to the DC/DC converter 2. Moreover, a voltage-current detector 13 is provided on an output side of the switching regulator 11 and the series regulator 12. The electric control unit 3 is arranged to control the switching regulator 11 and the series regulator 12 with a controller 14 based on values detected by the voltage-current detector 13.

Here, if a voltage is supplied to the load 6 in the state where the low-voltage battery 7 is empty with almost no electric charges therein, the voltage flowing into the load 6 will be too low to drive the load 6, because most of the electric current will be allotted to the low-voltage battery 7. Meanwhile, if an output voltage obtained by converting the high voltage (42 volts) into the low voltage (14 volts) using the DC/DC converter 2 is directly supplied to the low-voltage battery 7, a large electric current will flow into the low-voltage battery 7 and charging efficiency will be degraded. In this regard, the electric charge control unit 3 performs processing to control the switching regulator 11 and the series regulator 12 so as to charge the low-voltage battery 7 with a constant low electric current, thus improving charging efficiency thereof.

The switching regulator 11 performs rapid on/off switching of the voltage inputted from the DC/DC converter 2 to convert a direct-current voltage into pulses, and a stable direct-current voltage is obtained after smoothing these pulses. The switching regulator 11 supplies the stable direct-current voltage to the low-voltage battery 7.

The switching regulator 11 starts and stops operation in response to on/off control signals from the controller 14. Moreover, a target voltage value is inputted from the controller 14 to the switching regulator 11. The voltage is varied by adjusting pulse intervals inside the series regulator 11 based on the target voltage value, whereby the low-voltage battery 7 is charged with a constant electric current.

The series regulator 12 varies an output voltage by serially adjusting power consumption to cancel the voltage inside the series regulator 12 when the voltage inputted from the DC/DC converter 2 varies, whereby the low-voltage battery 7 is charged with a constant electric current.

The series regulator 12 starts and stops operation in response to the on/off control signals from the controller 14. Moreover, the target voltage value is inputted from the controller 14 to the series regulator 12. The voltage is varied by adjusting power consumption based on the target voltage value, whereby the low-voltage battery 7 is charged with a constant electric current.

The controller 14 recognizes current values and voltage values supplied from the switching regulator 11 or the series regulator 12 to the low-voltage battery 7 from the values detected by the voltage-current detector 13. The controller 14 computes and outputs the target voltage value indicating a voltage value to cause constant electric current output from the switching regulator 11 or the series regulator 12. In this way, the output voltage value of the switching regulator 11 or the series regulator 12 is controlled. The controller 14 computes the target voltage value so as to set the target voltage value a little higher than the charged voltage of the low-voltage battery 7. In other words, if the charged voltage of the low-voltage battery 7 is increased due to the progress of electric charge upon charging of the low-voltage battery 7 with the switching regulator 11 or the series regulator 12, the controller 14 shifts up the target voltage value accordingly.

The switching unit 5 is composed of a transistor, for example. The switching unit 5 is connected to an unillustrated ignition switch to be operated by a car driver or the like. When the ignition switch is in an off-state, an H signal is inputted to a gate terminal of the switch 5, whereby the relay 4 is set to a conductive state. When the ignition switch is in an on-state, an L signal is inputted to the gate terminal of the switch 5, whereby the relay 4 is set to an open state.

In this way, the load driving device is set to a state of charging the low-voltage battery 7 when the ignition switch is in an on-state. When the ignition switch is in an off-state, the DC/DC converter 2 is stopped and the relay 4 connects the low-voltage battery 7 and the load 6, whereby the electric charges accumulated in the low-voltage battery 7 are supplied to the load 6 via the relay 4.

Figure 3:
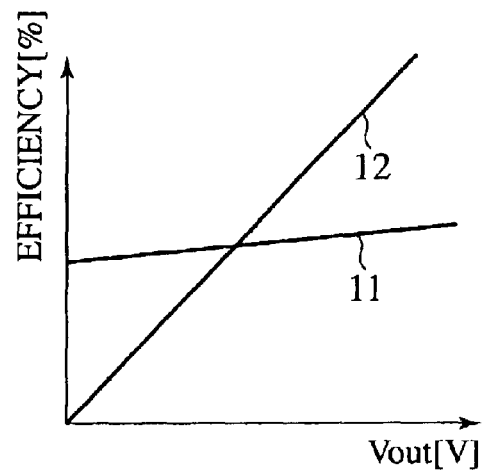
FIG. 3 is a graph describing the relation between the converting efficiencies of a switching regulator and a series regulator and the output voltages respectively thereof.

The conversion efficiencies of the switching regulator 11 and the series regulator 12 are shown in FIG. 3.

According to FIG. 3, the efficiency of the switching regulator 11 is made constant by the controller 14. Therefore, if the output voltage Vout is increased, efficiency improves a little because of a decrease in the ratio of pulse conversion, but efficiency remains almost constant.

Efficiency of the series regulator 12 is expressed approximately as a proportion of the output voltage to the input voltage. Assuming that the efficiency of the switching regulator 11 is around 50%, when the charged voltage of the low-voltage battery 7 is increased due to progress of electric charge, the efficiency of the series regulator 12 exceeds the efficiency of the switching regulator 11 in the vicinity of the output voltage Vout at a point slightly higher than ½ of the input voltage.

[Operation of Electric Charge Control Unit 3]

Figure 4:
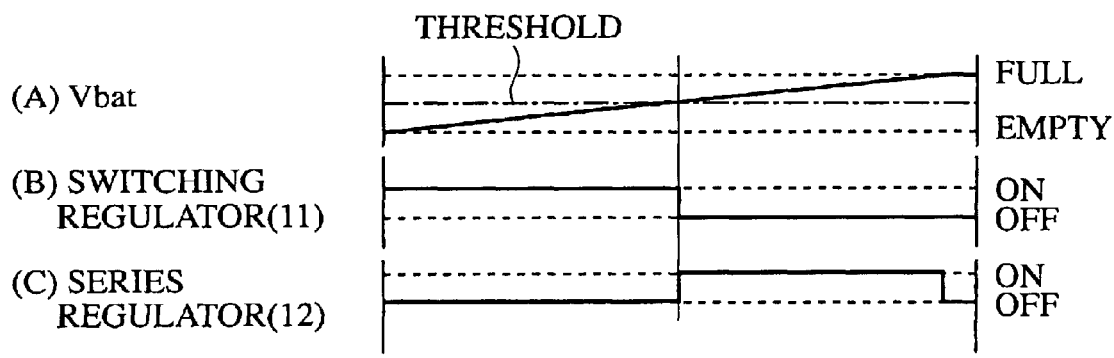
FIG. 4 is a timing chart of the control of driving by means of switching between the switching regulator and the series regulator with a controller in accordance with a charged voltage.

Now, description will be made below regarding an operation of the electric charge control unit 3, which constitutes the above-described load driving device, with reference to FIG. 4. Upon charging the low-voltage battery 7 in a state in which almost no electric charges accumulate in the low-voltage battery 7, the ignition switch is set to an on-state. The low voltage (14 volts) converted by the DC/DC converter 2 is supplied to the electric charge control unit 3 in the state where the relay 4 is set at open.

In this case, since the charged voltage of the low-voltage battery 7 is low, the controller 14 firstly outputs an on/off control signal to set the switching regulator 11 to an on-state. Then the voltage from the DC/DC converter 2 is supplied from the switching regulator 11 to the low-voltage battery 7 for collecting electric charge ((B) in FIG. 4). In this way, electric charges accumulate gradually in the low-voltage battery 7, whereby the charged voltage Vbat gradually increases. Relevantly, the controller 14 controls the switching regulator 11 so as to supply a voltage slightly higher than the charged voltage Vbat to the low-voltage battery 7, whereby the low-voltage battery 7 is charged with a constant low electric current.

The controller 14 monitors the voltage values detected by the voltage-current detector 13. When the charged voltage Vbat is at a predetermined threshold or more (a chain line in FIG. 4(A)), the controller 14 turns the switching regulator 11 off and turns the series regulator 12 on simultaneously. In this way, the controller 14 subsequently drives the series regulator 12 to charge the low-voltage battery 7. At this moment, it is possible to use both the switching regulator 11 and the series regulator 12 when the voltage value is at the predetermined value.

The controller 14 continues to monitor voltage using the voltage-current detector 13 even during charging by the series regulator 12. When the controller 14 judges that the low-voltage battery 7 is charged sufficiently, the controller 14 outputs an on/off control signal to turn off the series regulator 12 to finish electric charging ((A) and (C) in FIG. 4).

As described above in detail, according to the electric charge control unit 3 of the load driving device adopted in the present invention, the controller 14 operates the switching regulator 11 for electric charging when the charged voltage of the low-voltage battery 7 is low and therefore the target voltage is low. As the charged voltage of the low-voltage battery 7 increases gradually and the target voltage is increased so that the efficiency of the series regulator 12 exceeds the efficiency of the switching regulator 11, then the controller 14 can operate the series regulator 12 for electric charging. Therefore, as shown in FIG. 5, it is possible to charge in a state of high efficiency.

Figure 5:
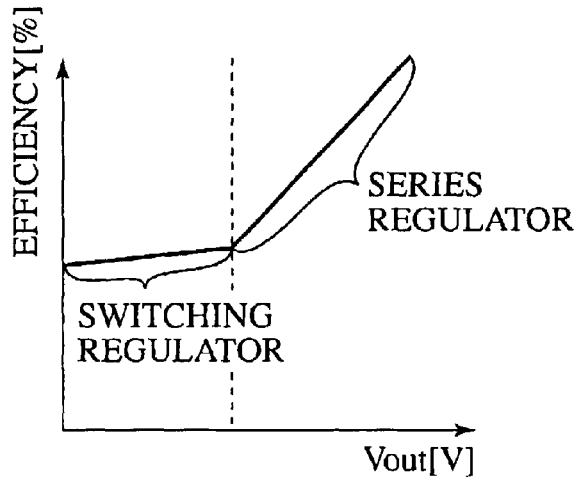
FIG. 5 is a graph describing the relation between the converting efficiencies of the switching regulator and of the series regulator and an output voltage.

As shown in FIG. 5, when the efficiency of the series regulator 12 exceeds the efficiency of the switching regulator 11, the low-voltage battery 7 is charged by use of the series regulator 12. Accordingly, it is possible to charge efficiently. In FIG. 5, a dashed line indicates the voltage at which the efficiency of the series regulator 12 exceeds the efficiency of the switching regulator 11.

According to the electric charge control unit 3 as described above, if the efficiency of the switching regulator 11 is assumed to be about 50%, it is possible to gain efficiency of around 50% even when almost no electric charges are accumulated in the low-voltage battery 7. In a range where the output voltage Vout is high, higher efficiency is achieved by use of the series regulator 12. Hence, it is possible to charge in a state of high charging efficiency.

The entire content of Japanese Patent Application No. P2001-239,530 with a filing date of Aug. 7, 2001 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. An electric charge control device, comprising:

an electric power source for supplying a first voltage;

a converter connected to the electric power source for converting the first voltage into a second voltage which is lower than the first voltage;

a secondary battery that receives a direct-current voltage from the converter;

a switching regulator for receiving the second voltage from the converter and switching to vary an output voltage which is supplied to the secondary battery;

a series regulator for receiving the second voltage from the converter and adjusting power consumption to vary an output voltage which is supplied to the secondary battery;

a voltage detector for detecting the output voltage from the switching regulator and the series regulator; and a controller for controlling the output voltage based on a voltage value detected by the voltage detector so as to charge from any one of the switching regulator and the series regulator to the secondary battery with a constant electric current, wherein the controller performs controlling so that the secondary battery is charged by the switching regulator when the voltage value is at a predetermined value or below, and the controller performs controlling so that the secondary battery is charged by the series regulator when the voltage value is at the predetermined value or more, and wherein the controller retains the predetermined value indicating an output voltage at which the efficiency of the series regulator exceeds the efficiency of the switching regulator.

2. The electric charge control device according to claim 1, wherein the controller performs controlling so that the output voltage from any one of the series regulator and the switching regulator is set to a value slightly higher than a charged voltage of the secondary battery.

3. A load driving device, comprising:

an electric power source for supplying a first voltage;

a converter connected to the electric power source for converting the first voltage into a second voltage which is lower than the first voltage;

an electric charge control unit connected to the converter;

a relay provided between the converter and the electric charge control unit;

a switching unit connected to the relay;

a load unit connected to the converter and the relay; and a secondary battery connected to the electric charge control unit and the relay that receives a direct-current voltage from the converter, the electric charge control unit, comprising:

a switching regulator for receiving the second voltage from the converter and switching to vary an output voltage which is supplied to the secondary battery;

a series regulator for receiving the second voltage from the converter and adjusting power consumption to vary an output voltage which is supplied to the secondary battery;

a voltage detector for detecting the output voltage from the switching regulator and the series regulator; and a controller for controlling the output voltage based on a voltage value detected by the voltage detector so as to charge from any one of the switching regulator and the series regulator to the secondary battery with a constant electric current, wherein an electric charge is supplied from the secondary battery to the load unit when the relay is set to a conductive state owing to a signal from the switching unit, wherein the electric charge is supplied from the converter to the load unit when the relay is set to an open state, wherein the controller performs controlling so that the secondary battery is charged by the switching regulator when the voltage value is at a predetermined value or below, and the controller performs controlling so that the secondary battery is charged by the series regulator when the voltage value is at the predetermined value or more, and wherein the controller retains the predetermined value indicating an output voltage at which the efficiency of the series regulator exceeds the efficiency of the switching regulator.

4. A load driving device according to claim 3, wherein the relay is set to the open state when the converter is in operation, and the relay is set to the conductive state when the converter stops operating.

5. A load driving device according to claim 3, wherein the load unit is a load driven by a voltage lower than the first voltage.

* * * * *